J. G. HODGSON.
NUT LOCK.
APPLICATION FILED APR. 8, 1911.
1,032,831.
Patented July 16, 1912.
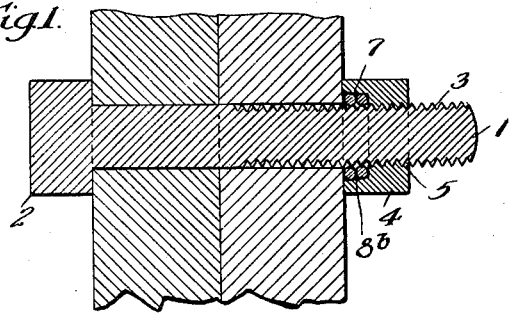
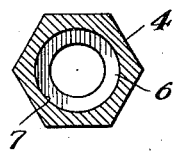
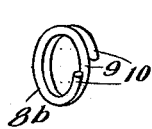
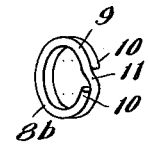
Witnesses:
Wm. Geiger
Pearl Abrams
Inventor:
John G. Hodgson
By Munday, Evarts, Adcock & Clarke
his Attys.

UNITED STATES PATENT OFFICE.

JOHN G. HODGSON, OF MAYWOOD, ILLINOIS.

NUT-LOCK.

1,032,831.

Specification of Letters Patent.

Patented July 16, 1912.

Application filed April 8, 1911. Serial No. 619,725.

*To all whom it may concern:*

Be it known that I, JOHN G. HODGSON, a citizen of the United States, residing in Maywood, in the county of Cook and State of Illinois, have invented a new and useful Improvement in Nut-Locks, of which the following is a specification.

My invention relates to improvements in nut-locks.

The object of my invention is to provide a nut lock of a simple and efficient construction, capable of being cheaply manufactured, which will be efficient and reliable in operation, and be adapted for use upon ordinary constructions of bolts without requiring any changes or special constructions of the bolt, and which will not injure or mutilate the threads, and which at the same time will enable the nut to be unscrewed with a wrench, while effectually preventing unscrewing of the nut or its becoming accidentally loosened incident to vibration or jarring of the members to which the bolt is attached or changes in temperature.

My invention consists in the means I employ to practically accomplish this object or result. That is to say, it consists in connection with a bolt of any suitable or ordinary construction, of a nut furnished with a recess in one face having a slightly tapering or wedging wall and a compressible locking member, preferably in the form of a coil bushing fitting in said recess of the nut and adapted to be closed against the threads of the bolt and to tightly clamp the same as the nut is screwed home, the compressible locking member being preferably formed of some relatively soft metal, such as brass, copper, Babbitt, solder, lead or the like, to prevent danger of its injuring the threads of the bolt and also to prevent its clamping or locking the bolt so rigidly and firmly as to interfere with the subsequent unscrewing of the nut with a wrench when desired.

In the accompanying drawing forming a part of this specification, Figure 1 is a central, longitudinal section of a nut lock embodying my invention, as applied to a threaded bolt of ordinary construction. Fig. 2 is a detail, perspective view of the compressible locking member. Fig. 3 is a detail sectional view of the nut. Fig. 4 is a detail perspective view showing the compressible locking member after the same has been compressed.

In the drawing, 1 represents the bolt, 2 its head, 3 its screw threads, the screw threads being preferably continuous instead of notched, grooved or segmental.

The nut 4 is furnished with the customary screw threads 5 and it is provided on one of its faces with a recess 6 which is preferably circular in cross section and formed simply by counterboring the nut. The recess of the nut preferably has a slightly tapering or wedging interior wall 7.

The compressible locking member fits in the recess of the nut and is adapted to be compressed or clamped against the bolt as the nut is screwed home, and is preferably in the form of a coil bushing and preferably made of a relatively soft metal, such as brass or copper to prevent injury to the screw threads of the bolt as the locking member is clamped against the bolt by being forced farther into the recess of the nut as the nut is screwed home; and so that the screw threads of the bolt may embed themselves to a greater or less extent into the locking member and thus increase its holding and locking action and the friction and gripping surface. By making the locking member of a relatively soft metal, such as brass or copper, as compared with the iron or steel of the bolt, the nut is also adapted to be removed from the bolt with a wrench, while at the same time the locking member effectually prevents any possibility of the nut becoming loosened under any vibration or jarring action or changes of temperature of the members to which the bolt may be applied.

In practice, I prefer that the tapering or wedging wall should be made on the nut instead of upon the locking member, although the action is the same upon whichever member the wedging or tapering wall is formed. It is a more convenient construction to form the tapering or wedging wall on the nut instead of upon the locking member. In practice, I prefer to make the compressible locking member of a relatively strong soft metal, such as brass or copper instead of still softer metals such as Babbitt or solder, and to make it of the ring form as above described.

The compressible locking member is made out of round wire and of a continuous spiral coiled form, as shown at 8$^b$ in Figs. 1, 2 and 4 and is preferably formed of a plurality of coils and with the adjacent ends of the wire not overlapping so that the intermediate coil of the wire 9 between the two ends 10, 10 will receive an offset 11 as the nut is screwed home, thus contracting the circumference of the coil 9 and thereby clamping it upon the bolt.

As the recessed wall of the nut is only slightly tapering, when the compressible locking member is once forced into the recess by screwing the nut home, it always remains rigidly and firmly in position in the nut and firmly clamping and embedding itself into the bolt, even though by changes of temperature or other causes, the nut should cease to have a tight clamping effect upon the members which they secure together, or even though the nut should be loosened by partially unscrewing it and then left by mistake without being tightened up. My nut lock, thus after being once caused to grip the bolt, always acts without relaxing to prevent accidental unscrewing of the nut. It acts constantly as a brake to prevent turning of the nut until the nut is entirely unscrewed and the compressible locking member removed from the recess of the nut.

I claim:—

1. The combination with a threaded bolt, of a recessed nut having a flaring wall and a coiled ring locking member having a plurality of convolutions adapted to be compressed against the bolt as the nut is screwed home, substantially as specified.

2. The combination with a threaded bolt, of a recessed nut having a flaring wall and a coiled ring locking member having a plurality of convolutions and adapted to be compressed against the bolt as the nut is screwed home, said locking member being of relatively soft material and adapted to embed the threads of the bolt therein.

3. The combination with a threaded bolt, of a recessed nut and a coiled locking member having a plurality of convolutions having also ends, and located within the recess and adapted to be compressed against the bolt as the nut is screwed home, the ends of said locking member being normally spaced apart axially of the nut, whereby the intermediate coil will be offset as the nut is screwed home, thereby contracting the circumference of the coil, substantially as specified.

JOHN G. HODGSON.

Witnesses:
PEARL ABRAMS,
EDMUND ADCOCK.